Figure 1:
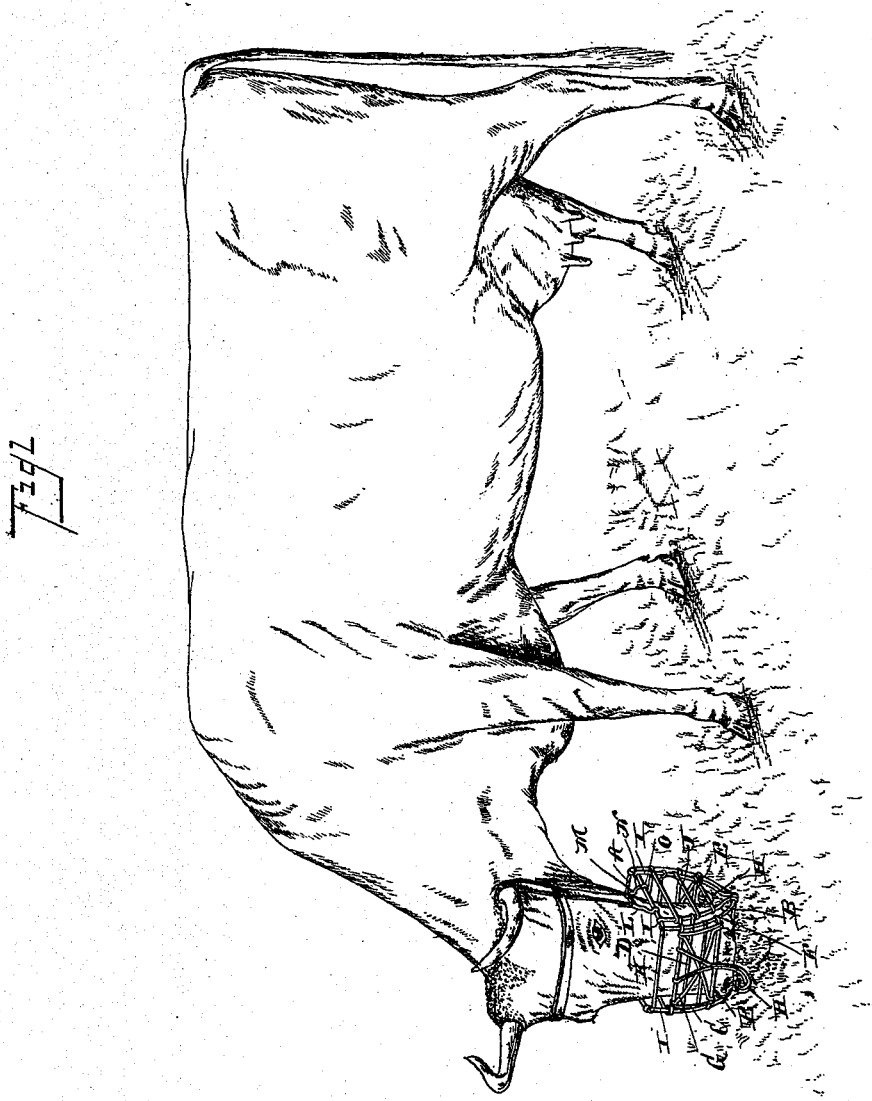

(No Model.) 2 Sheets—Sheet 1.

E. B. WEBBER.
MUZZLE.

No. 413,878. Patented Oct. 29, 1889.

Witnesses
John Imirie
R. W. Bishop

Inventor
Edward B. Webber
By his Attorneys,
C. A. Snow & Co.

(No Model.) 2 Sheets—Sheet 2.
E. B. WEBBER.
MUZZLE.
No. 413,878. Patented Oct. 29, 1889.
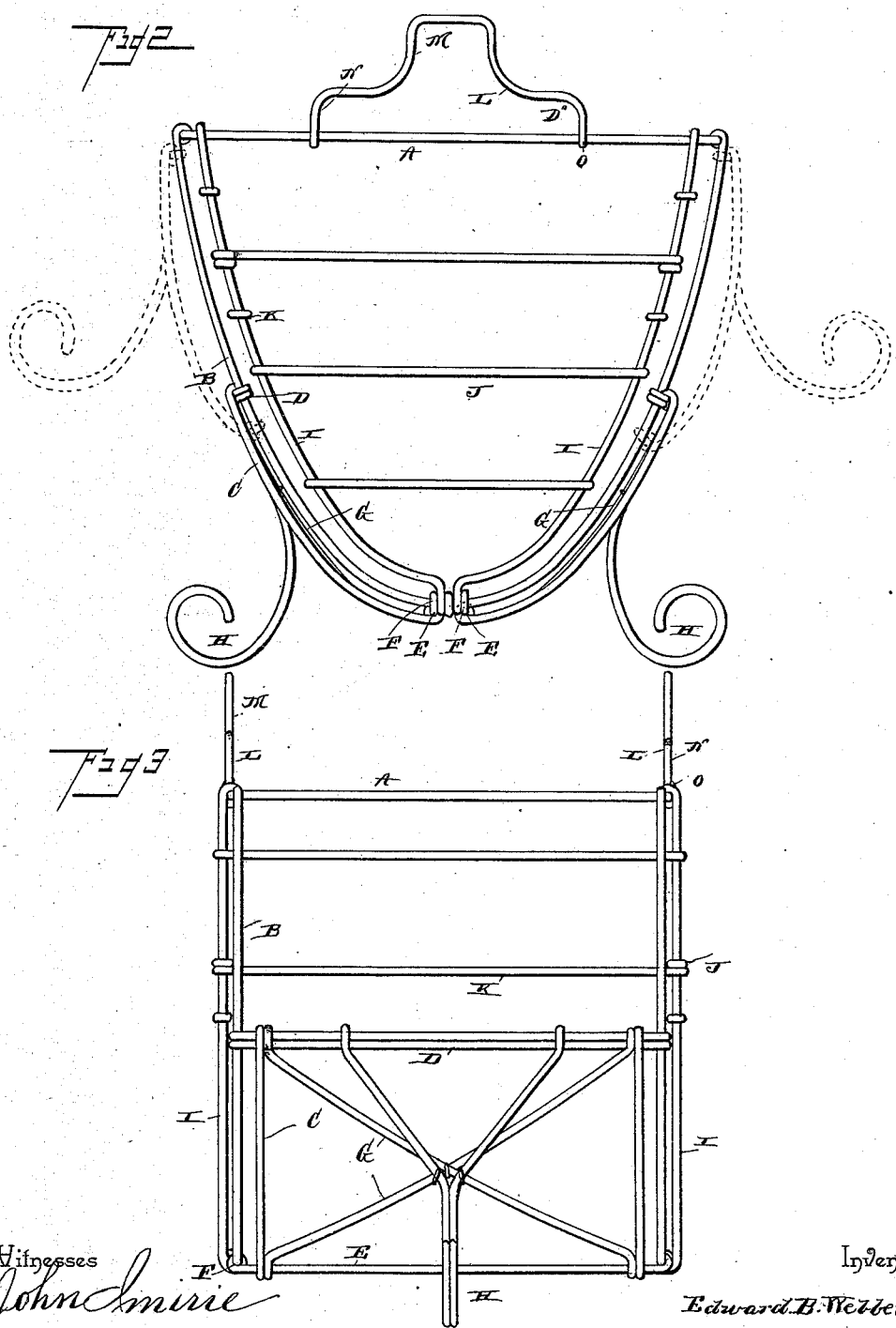
Witnesses
John Imirie
R. W. Bishop
Inventor
Edward B. Webber
By his Attorneys,
C. A. Snow & Co.

UNITED STATES PATENT OFFICE.

EDWARD B. WEBBER, OF COLLIERVILLE, TENNESSEE.

MUZZLE.

SPECIFICATION forming part of Letters Patent No. 413,878, dated October 29, 1889.

Application filed June 25, 1889. Serial No. 315,536. (No model.)

*To all whom it may concern:*

Be it known that I, EDWARD B. WEBBER, a citizen of the United States, residing at Collierville, in the county of Shelby and State of Tennessee, have invented a new and useful Muzzle, of which the following is a specification.

My invention relates to improvements in muzzles for cattle; and it consists in certain novel features, hereinafter described and claimed.

In the accompanying drawings, Figure 1 is a view of a cow, showing my improved muzzle in its operative position. Fig. 2 is a side view of the muzzle, and Fig. 3 is a front view of the same.

In constructing the muzzle in accordance with my invention I employ a wire A, which is bent to form an open rectangular frame, as clearly shown, and to the corners of the frame thus constructed I secure the depending semi-elliptical guides B, on which the doors C are mounted. The said guides are braced at a point about midway between their ends and their centers by a bar D, which has its ends secured to the said guides and extends between the same. The doors are composed of the base-wires E E, provided at their ends with the eyes or loops F, which encircle the guides B and extend between the said guides. These base-wires E are connected by the braces G, which extend between them longitudinally of the guides and diagonally between the same, as clearly shown. The doors are further provided with the outstanding arms H, which are secured to the base-wires and the braces, and are adapted to strike against the ground when the animal lowers its head, so as to cause the doors to slide up on the guides, and thus permit the animal to feed.

I I designate wires, which are arranged substantially parallel with the guides B, and have their upper ends secured to the frame A and their lower ends secured to the guides. Connecting wires or braces J J are secured to and extend between these wires I I and close the ends of the muzzle, and similar wires K K are secured to the upper portions of the said wires I I and extend between the frame to close the front and rear sides thereof. Hangers L L are mounted on the wire A to permit the device to be attached to the head of the animal, and the said hangers consist of a wire bent to provide a U-shaped portion M and the arms N, extending therefrom and provided with eyes O at their ends, which encircle the wire A.

My improved muzzle is secured to the head of the animal, as clearly shown in Fig. 1, and the doors C slide down the guides B by reason of their own weight, so as to close the muzzle. The animal will thus be prevented from biting, and consequently will be rendered harmless. When the animal desires to feed, however, and lowers its head, the arms projecting from the doors will strike against the ground and force the doors upward as the head is lowered, so as to permit the animal to feed.

The construction of my device gives it great strength and durability, at the same time relieving it of all unnecessary weight, so that it will be easy and comfortable to the animal.

Having described my invention, what I claim, and desire to secure by Letters Patent, is—

1. The improved muzzle consisting of the wire frame A, the elliptical guide secured to the said frame, the wires I I, arranged parallel with the guides, the connecting-wires secured to and between the wires I I, the doors provided with eyes at their corners engaging the guides, and the outwardly-projecting arms H on the doors, as set forth.

2. The improved muzzle consisting of the wire frame A, having the guides B and the gravity-doors C, sliding vertically on the guides independently of each other, and having the arms H, said doors being arranged at the front and rear of the wire frame and coming together in their normal position at the bottom of the frame, for the purpose set forth.

In testimony that I claim the foregoing as my own I have hereto affixed my signature in presence of two witnesses.

EDWARD B. WEBBER.

Witnesses:
W. J. NORTHCROSS,
R. F. C. MOSS.